United States Patent [19]

Munter

[11] 4,021,652

[45] May 3, 1977

[54] INCREMENTALLY ADJUSTABLE DIGITAL ATTENUATOR/AMPLIFIER

[75] Inventor: Ernst August Munter, Ottawa, Canada

[73] Assignee: Northern Electric Company Limited, Montreal, Canada

[22] Filed: Dec. 11, 1975

[21] Appl. No.: 639,848

[52] U.S. Cl. .......................... 235/152; 179/15 AC
[51] Int. Cl.² .......................................... G06F 7/38
[58] Field of Search .......................... 235/152, 154; 340/347 DD, 172.5; 179/15 AC, 15 AV

[56] References Cited

UNITED STATES PATENTS 3,688,097  8/1972  Montgomery .................... 235/152
3,752,970  8/1973  Aaron et al. ...................... 235/152

Primary Examiner—David H. Malzahn
Attorney, Agent, or Firm—Frank Turpin

[57] ABSTRACT

An interface circuit adapted to selectively input serial and parallel PCM coded words and to selectively output serial and parallel PCM coded words is connected to a memory means. The memory means has a storage capacity for at least $2^n$ memory words, each one having an address corresponding to a respective one of the PCM coded words appearing at the interface circuit and each one representing X db of signal level variation relative to its corresponding coded word. The output of the memory means is connected back to the parallel input of the interface circuit. A control means provides timing and control signals for loading the interface circuit with one of the coded words and for causing the memory means to be addressed at the location defined by the coded word. The control means includes means for circulating the coded word through the memory means a predetermined number of times M. The first memory address is defined by the input coded word and every subsequent address is defined by the memory word read out in the previous memory cycle, whereby the output from the circuit is a coded word representing MX db of signal level variation relative to the input coded word.

7 Claims, 1 Drawing Figure

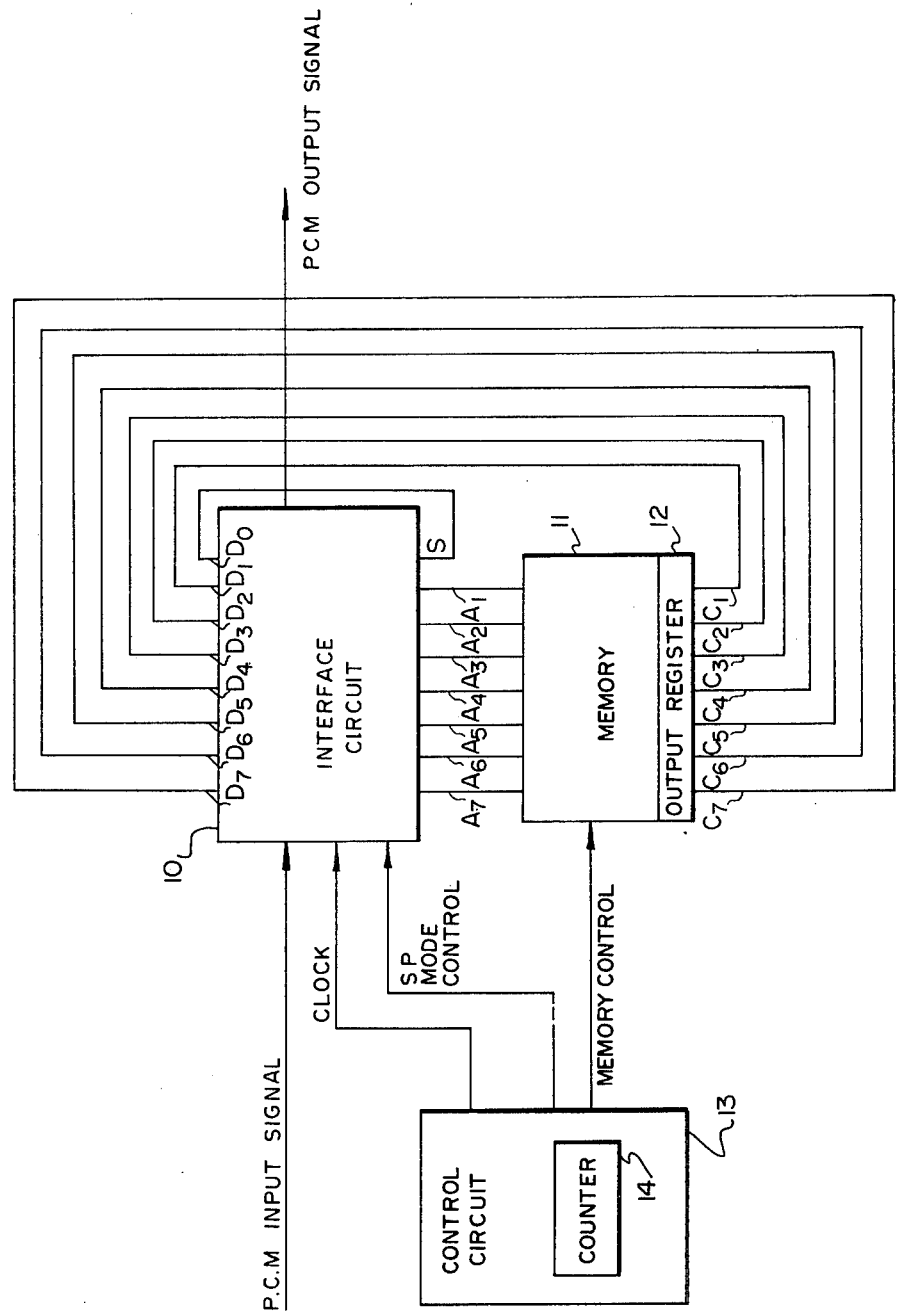

INCREMENTALLY ADJUSTABLE DIGITAL ATTENUATOR/AMPLIFIER

This invention relates generally to pulse code modulation systems and more particularly to a novel method and circuit for providing incremental variation of signal levels in PCM systems.

In the conventional communication systems such as the telephone system, it is often necessary to vary a signal level in order to make it compatible with signal processing apparatus. A variety of analog circuits have been designed to perform this function.

However, the contemporary communication systems presently being developed use digital encoding techniques such as pulse code modulation (PCM). This technique involves the coding of analog signals into corresponding binary words in accordance with predetermined encoding laws such as the 15-segment form which is termed the "$\mu$ law" and the 13-segment form which is called the "A law." In some systems, signal attenuation, is achieved by first decoding the binary information into analog information, processing the analog information, and then coding the analog information into binary data. Another method consists of providing digital circuits designed according to a mathematical algorithm for providing the digital processing of the binary code. This type of circuitry is discussed in the following articles: (1) IEEE Transactions on Communication Technology, Vol. Com-19, No. 6, December 1971, pages 1076 – 1087 and; (2) IEEE Transactions on Communication Technology, Vol. Com-19, No. 3, June 1971, pages 315 to 319.

The concepts for building digital attenuators for PCM signals are based on the companding structure of the code, and use either an expansion - attenuation - compression circuit, or a recursive circuit implementing some algorithm for generating an attenuated PCM output signal from the input PCM signal. If a 3-db attenuator is required, a circuit is designed in accordance with some algorithm to provide the required attenuation, and if a 6-db attenuator is required, a second circuit is dsigned to fulfill that requirement.

As shown in the above references, the circuits developed for the digital attenuation of binary coded signals tend to be fairly complex as well as suffer from other disadvantages. For example, a new circuit must usually be designed for every value of attenuation required. Because they are complex, these circuits are usually realized as custom integrated circuits using large scale integration techniques, in which case they tend to be very expensive, or they are realized using discrete integrated circuits such as gates and flip-flops, in which case, they tend to occupy a relatively large space.

On the other hand, the circuit of the invention may be implemented with very few off-the-shelf integrated circuits. In addition, the invention provides incrementally adjustable variation of PCM signal levels.

In accordance with the invention, there is provided a circuit for providing incrementally adjustable variation of signal levels in a pulse code modulation system wherein analog signal levels are represented by binary words encoded according to a predetermind law and resulting in a possibility of $2^n$ coded words for signals of each polarity. A memory means having at least a storage capacity for $2^n$ memory words, is loaded with memory words, each one corresponding to a respective one of said coded words and each one representing X db of signal level variation relative to its corresponding coded word. An interface circuit having at least $n$ storage locations is connected to the input of the memory means. A control means is provided for loading the interface circuit with one of the coded words and for causing the memory means to be addressed at the location defined by the coded word. The control means further includes means for circulating said one of said coded words through the memory means a predetermind number of times M, the first memory address being defined by said one of said coded words and every subsequent address being defined by the memory word read out in the previous memory cycle, whereby the output from the circuit is a coded word representing MX db of signal level variation relative to said one of said coded words.

From another aspect, the invention resides in the method for providing incrementally adjustable variation of PCM signal levels, using the above apparatus.

The invention provides a simple and accurate circuit and method for attenuating or amplifying a PCM signal any quantity corresponding to a predetermined plurality of predetermined units of attenuation or gain.

An example embodiment of the invention will now be described in conjunction with the drawing which illustrates a digital attenuator in accordance with the invention.

In the ensuing discussion, the invention will be described using a PCM signal in which each coded word (sample) consists of 8 bits - 7 bits for the signal level and 1 bit for the direction (sign bit). It should be understood that the invention is equally applicable to PCM signals which are encoded using other laws.

In the drawing, an interface circuit 10 is shown as having an input terminal for receiving a serial PCM input signal and an output terminal for providing a serial PCM output signal. The interface circuit 10 may be a commercially available shift register adapted to perform serial-to-parallel and parallel-to-serial conversion of data or it may be a special purpose circuit such as a shift register matrix, for example as described in U.S. Pat. No. 3,778,773 to D. F. Hood and assigned to applicant's assignee. The output of the interface circuit 10 is connected to a memory means 11 via connections A1 to A7. The sign bit lead S is connected back to an input DO of the interface circuit 10. The memory means may conveniently be an off-the-shelf read-only-memory (ROM) having a storage capacity for $2^n$ memory words each of $n$ bits. In this embodiment, the memory must therefore have a capacity of $2^7$ or 128 words $\times$ 7 bits or 896 bits.

Connected at the output of the memory means 11 is an output register 12 which may, in some cases, be an integral part of a ROM module. The function of the output register 12 is to store the information read out of the memory means 11. Therefore, the provision of this register is not necessary as long as its function may be assumed by the interface circuit 10. The outputs of the register 12 are connected to the parallel inputs D1 to D7 of the interface circuit 10 via connections C1 to C7 respectively. The attenuator circuit just described is controlled by a control circuit 13 which in a PCM system would be a portion of the central processing unit or controller for the system. Its function is to issue timing and function signals such as clock signals, serial/parallel mode control signals, and memory control signals. In this instance, the control circuit may include a counter 14 whose function will be evident in the ensuing description of the operation of the attenuator.

DESCRIPTION OF OPERATION

The digital attenuator of the invention is based on the observation that for every possible input coded word, a specific output code is to be derived. The sign bit remains unchanged, which leaves the remaining seven bit combination of the input coded word to be translated into another seven bit combination for the output coded word. This may be realized by using an AND-OR gate matrix, exhaustively decoding the input code, and recombining the product-terms to generate the correct output coded word for each possible input coded word. It is evident that this matrix can be programmed to provide any code correspondence; consequently, it can be designed to exactly simulate the input-output correspondence obtained by any attenuating circuits. It is however, not limited to a companding law possessing some kind of special characteristics such as one composed of linear segments, and it can equally well be programmed to perform the processing on continuous companding laws.

A programmable AND-OR matrix such as described above is available commercially in the form of a ROM or a programmable ROM. The memory is loaded with $2^n$ memory words, each one having an address corresponding to a respective one of the PCM words which may appear at the input terminal of the interface circuit 10 and each one representing X db of signal level attenuation relative to its corresponding address. These memory words may be derived mathematically using well-known techniques. These are described in the following reference: Recommendation G.711, PCM of Voicefrequencies, pp 372 – 377, Volume III–2 of the Green Book-Line Transmission, Fifth Plenary Assembly, Geneva, 4–15 December 1972, published by the International Telecommunications Union - 1973. By observing these criteria, it is possible to derive a PCM coded word which represents X db of signal level attenuation relative to another PCM coded word. Thus, for a PCM companding law which uses $2^n$ words for coding signals of each plurality (e.g. mu-law), it is possible to derive a corresponding series of $2^n$ words which represent X db of attenuation relative the original words. Of course, the sign bit remains the same for the derived word. For example the following table gives the correspondence between words for a PCM series of words (encoded in accordance with the mu-255 companding law) attenuated by 3 dbs.

| INPUT CODED WORD | OUTPUT CODED WORD (-3.0 db) | INPUT CODED WORD | OUTPUT CODED WORD (-3.0 db) |
| --- | --- | --- | --- |
| 0 | 0 | 13 | 9 |
| 1 | 1 | 14 | 10 |
| 2 | 1 | 15 | 11 |
| 3 | 2 | 16 | 12 |
| 4 | 3 | 17 | 13 |
| 5 | 4 | 18 | 15 |
| 6 | 4 | 19 | 16 |
| 7 | 5 | 20 | 16 |
| 8 | 6 | 21 | 17 |
| 9 | 6 | 22 | 18 |
| 10 | 7 | 23 | 19 |
| 11 | 8 | 24 | 19 |
| 12 | 8 | 25 | 20 |
| 26 | 21 | 55 | 49 |
| 27 | 21 | 56 | 49 |
| 28 | 22 | 57 | 50 |
| 29 | 23 | 58 | 51 |
| 30 | 24 | 59 | 52 |
| 31 | 24 | 60 | 52 |
| 32 | 25 | 61 | 53 |
| 33 | 27 | 62 | 54 |
| 34 | 28 | 63 | 54 |
| 35 | 30 | 64 | 55 |
| 36 | 31 | 65 | 57 |
| 37 | 32 | 66 | 58 |
| 38 | 33 | 67 | 60 |
| 39 | 33 | 68 | 61 |
| 40 | 34 | 69 | 63 |
| 41 | 35 | 70 | 64 |
| 42 | 35 | 71 | 64 |
| 43 | 36 | 72 | 65 |
| 44 | 37 | 73 | 66 |
| 45 | 38 | 74 | 67 |
| 46 | 38 | 75 | 67 |
| 47 | 39 | 76 | 68 |
| 48 | 40 | 77 | 69 |
| 49 | 41 | 78 | 69 |
| 50 | 43 | 79 | 70 |
| 51 | 44 | 80 | 71 |
| 52 | 46 | 81 | 73 |
| 53 | 47 | 82 | 74 |
| 54 | 48 | 83 | 75 |
| 84 | 77 | 106 | 98 |
| 85 | 78 | 107 | 99 |
| 86 | 79 | 108 | 100 |
| 87 | 80 | 109 | 100 |
| 88 | 81 | 110 | 101 |
| 89 | 82 | 111 | 102 |
| 90 | 82 | 112 | 103 |
| 91 | 83 | 113 | 104 |
| 92 | 84 | 114 | 106 |
| 93 | 85 | 115 | 107 |
| 94 | 85 | 116 | 109 |
| 95 | 86 | 117 | 110 |
| 96 | 87 | 118 | 111 |
| 97 | 88 | 119 | 112 |
| 98 | 90 | 120 | 113 |
| 99 | 91 | 121 | 114 |
| 100 | 93 | 122 | 114 |
| 101 | 94 | 123 | 115 |
| 102 | 95 | 124 | 116 |
| 103 | 96 | 125 | 116 |
| 104 | 97 | 126 | 117 |
| 105 | 98 | 127 | 118 |

In the embodiment of the invention illustrated in the drawing, the memory means 11 would be loaded with the PCM coded words labelled OUTPUT CODED WORD (−3.0 db) in the above list. The operation of the circuit may be described by following a signal through the attenuator. Let us assume that a serial PCM signal corresponding to input coded word 31 appears at the input terminal of the interface circuit 10 and is required to be attenuated by 9 db. In response to this request, the control circuit 13 sets the counter 14 to a count of 3, and issues a serial-to-parallel mode control signal to the interface circuit 10 to convert the serial input coded word 31 to parallel form. The seven quantity bits (exclusive of the sign bit) of the input coded word 31 appear on leads A1 to A7 and serve as the address for memory word 31 in the memory 11. The memory word at address 31 is read out into output register 12. This word corresponds to PCM coded word 24 and represents a signal level attenuation of 3 db relative to the input coded word 31. Coded word 24 is then caused to appear at the parallel inputs D0 to D7 of the interface circuit 10 via lead S and C1 to C7. It may be noted that the sign bit is simply made to bypass the memory as it remains unchanged when a signal is attenuated. The control circuit then decrements the counter 14 and issues control signals to repeat the process. Only this time, the memory address corresponds to coded word 24 and the output word from the memory corresponds to coded word 19. On the third pass through the attenuator, the memory address is 19 and the output coded word is 16. At this time, the control circuit decrements the counter 14 to zero and causes the coded word 16 appearing at inputs D0 to D7 to be loaded in parallel into the interface circuit 10 and to be outputted serially at its output terminal. Therefore, by circulating the input coded word 31 3 times through the attenuator, an output coded word 16 which represents 9 db of signal level attenuation relative to the input coded word 31 is obtained.

Hence, if the memory is loaded with coded words representing X db of signal level attenuation relative to the input coded word, then M cycles through the attenuator is required to achieve MX db of signal level attenuation.

It should be realized that amplification of a PCM signal may be realized using the same apparatus and method. In this case, the memory is loaded with coded words representing X db of amplification relative to the input coded word and M cycles of the memory results in an output signal representing MX db of amplification relative to an input coded word.

Therefore, the method and apparatus of the invention provide a digital attenuator or amplifier which is simple, versatile, economical and which may be realized using off-the-shelf components. In addition, by judiciously choosing the predetermined increment of signal level variation to be loaded into memory, a single circuit of the invention may be made to fill a wide range of amplification/attenuation requirements.

What is claimed is:

1. In a pulse code modulation system wherein analog signal levels are represented by binary words encoded according to a predetermined law and resulting in a possibility of $2^n$ coded words for signals of each polarity, the system comprising a memory means having at least a storage capacity for $2^n$ memory words, each one having an address corresponding to a respective one of said coded words and each one representing X db of signal level variation relative to its corresponding coded word, a method of providing incrementally adjustable variation of signal levels, comprising the steps of:
   addressing said memory means with one of said coded words; and
   circulating said one of said coded words through the memory means a predetermined number of times M, a first memory address being defined by said one of said coded words and every subsequent address being defined by the memory word read out in the previous memory cycle, whereby the output from the memory means on termination of the last pass therethrough is a coded word representing MX db of signal level variation relative to said one of said coded words.

2. A circuit for providing incrementally adjustable variation of signal levels in a pulse code modulation system wherein analog signal levels are represented by binary words encoded according to a predetermined law and resulting in a possibility of $2^n$ coded words for signals of each polarity, comprising:
   memory means having at least a storage capacity for $2^n$ memory words, each one having an address corresponding to a respective one of said coded words and each one representing X db of signal level variation relative to its corresponding coded word;
   an interface circuit adapted to selectively receive serial and parallel data and to selectively output serial and parallel data, said interface circuit having its parallel input connected to the output of the memory means and its parallel output connected to the address input of the memory means;
   control means for effecting the loading of said interface circuit with one of said coded words, and for enabling the memory means to be addressed at the location defined by said coded word;
   said control means including means for effecting the circulation of said one of said coded words through the memory means via said interface circuit a predetermined number of times M, a first memory address being defined by said one of said coded words and every subsequent address being defined by the memory word read out in the previous memory cycle, whereby the output from the memory means on termination of the last pass therethrough is a coded word representing MX db of signal level variation relative to said one of said coded words.

3. A circuit as defined in claim 2 wherein said memory means is a read-only memory.

4. A circuit for providing incrementally adjustable variation of signal levels in a pulse code modulation system wherein analog signal levels are represented by binary words encoded according to a predetermined law and resulting in a possibility of $2^n$ coded words for signals of each polarity, comprising:
   memory means having at least a storage capacity for $2^n$ memory words, each one having an address corresponding to a respective one of said coded words and each one representing X db of signal level variation relative to its corresponding coded word;
   an interface circuit having at least $n$ storage locations;
   control means for effecting the loading of said interface circuit with one of said coded words, and for enabling the memory means to be addressed at the location defined by said coded word;
   a storage means for storing a first memory word located at the memory address defined by said coded word, the output of said storage means being connected to the input of the interface circuit and wherein said control means includes means for effecting the loading of said first memory word into said interface circuit, whereby said first memory word serves as the address of a second memory word which represents X db of signal level variation relative to the first memory word and 2X db of signal level variation relative to said one of said coded words.

5. A circuit as defined in claim 4 wherein the control means includes counter means responsive to signals from said control means for causing said one of said coded words to be circulated through the memory means a predetermined number of times M, whereby the output memory word represents MX db of signal level variation relative to said one of said coded words.

6. A circuit as defined in claim 4 wherein the interface circuit is a register matrix adapted to selectively receive serial and parallel data and to selectively output serial and parallel data in response to signals from the control means.

7. A circuit as defined in claim 4 wherein said memory means is a read-only-memory.

* * * * *